United States Patent [19]

Tsukada et al.

[11] 4,276,986
[45] Jul. 7, 1981

[54] BOTTLE MADE OF SATURATED POLYESTER RESIN

[75] Inventors: Takami Tsukada, Funabashi; Masao Akutsu; Tadao Saito, both of Tokyo, all of Japan

[73] Assignee: Yoshino Kogyosho Co., Ltd., Tokyo, Japan

[21] Appl. No.: 74,881

[22] Filed: Sep. 12, 1979

[51] Int. Cl.³ .............................................. B65D 1/02
[52] U.S. Cl. ..................................... 215/1 C; 264/513
[58] Field of Search ........................ 215/1 C, 100 R; 264/513, 515, 516

[56] References Cited

U.S. PATENT DOCUMENTS

| | | | |
|---|---|---|---|
| 2,959,812 | 11/1960 | Allen | 264/516 X |
| 2,995,265 | 8/1961 | Soderberg | 215/100 R |
| 3,152,710 | 10/1964 | Platte | 215/1 C |
| 3,160,304 | 12/1964 | Peacock | 215/100 R |
| 3,225,951 | 12/1965 | Poston | 215/1 C X |
| 4,151,249 | 4/1979 | Lee | 264/520 |
| 4,170,622 | 10/1979 | Uhlig | 264/520 |

*Primary Examiner*—Donald F. Norton

[57] ABSTRACT

A bottle made of a saturated polyester resin and having one or more strip-shaped projection for the reinforcement and ornament purposes is provided, which bottle is produced by a method comprising the steps of preparing a parison having an opened upper end and a closed bottom end from a saturated polyester resin, welding a strip-shaped piece made of the same saturated polyester resin on said parison so as to extend in the vertical direction, and then biaxially orientating said parison and said strip-shaped piece as an integral body.

3 Claims, 4 Drawing Figures

BOTTLE MADE OF SATURATED POLYESTER RESIN

BACKGROUND OF THE INVENTION

The present invention relates to a bottle made of a saturated polyester resin provided with a vertically extending, strip-shaped projection on the trunk thereof.

The saturated polyester resins attract public attention for use as the material for bottles, since they prevent soaking of any harmful materials such as solvent differing from other synthetic resinous materials conventionally used for making bottles and no poisonous gas is generated when combusted after disposal. However, melted saturated polyester resin lacks fluidity as compared to other meltable materials and tends to gelatinize. This makes it difficult to mold therefrom a bottle of complicated contour and to form an embossed pattern on the outer face of the bottle.

Further, the parison made of a saturated polyester resin is crystallized at the glass transition temperature due to the interrelation between the temperature and the time to lose its elongation capacity. As a result, it is necessary to maintain the temperature within an appropriate range if the parison made of a saturated polyester resin is biaxially orientated and it is extremely difficult to effect the desired biaxial orientation particularly when the thickness of the parison is varied in parts.

OBJECT OF THE INVENTION

The object of the invention is to provide a bottle made of a saturated polyester resin which has thin trunk portion with the part being projected to form vertically extending, strip-shaped projection or land which reinforces the trunk of thin bottle and concurrently forms a convex pattern. A further object of the invention is to enable to form such strip-shaped projection on the face of the bottle by welding a strip to the parison thereby to easily mold an embossed portion on the bottle.

DETAILED DESCRIPTION OF THE INVENTION

Figure 1:
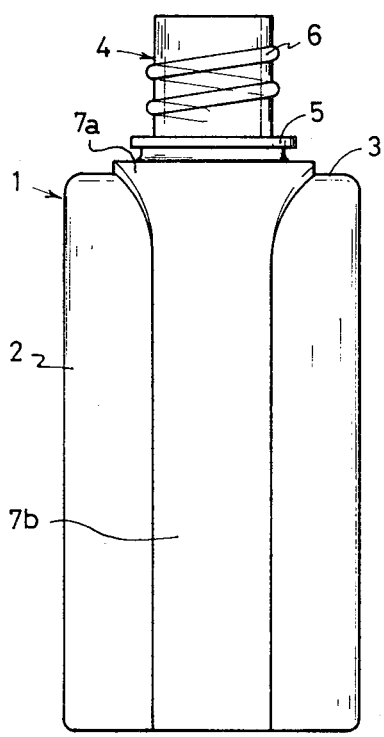
FIG. 1 is a front view of a bottle made of a saturated polyester resin according to the present invention.

The bottle of a saturated polyester resin according to the present invention will be described with reference to the appended drawing. A bottle 1 comprises a trunk 2 rising up from the periphery of the bottom of the bottle, a shoulder 3 at the upper end of the trunk 2, and a neck 4 projecting at the center of the shoulder 3 having a diameter smaller than that of the trunk. At the base of the neck 4 projects an outwardly facing flange 5, against which the bottom edge of a cap abutts. A thread 6 for meshing with the corresponding thread of the cap is provided on the outer face of the neck.

A projection 7a is formed on the portion surrounding the base of the neck 4 and integrally connected with two strip-shaped projections 7b which extend downwardly onto the bottom of the bottle at the peripheral portions of the trunk generally diametrially opposed to each other. It should be appreciated that the trunk 2 which is thin and somewhat weak is reinforced by the thick projections 7a and 7b which also serve as projected or embossed patterns.

Figure 2:
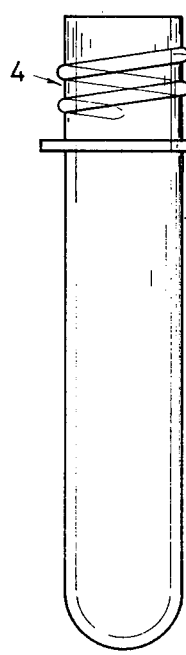
FIG. 2 is a front view of the parison used for molding the bottle.

The bottle made of a saturated polyester resin having the projections 7a and 7b may be formed by the following procedure. A parison 8 having an open upper end and a closed bottom end, as shown in FIG. 2, is molded through an injection molding using a saturated polyester resin as the molding material. The parison 8 has the thickness substantially even in its entirety, and provided with the neck 4, the thread 6 and the flange 5 concurrently formed at the injection molding step. In order to produce transparent parison 8, it is necessary to rapid cool the same immediately after molding step thereby to prevent crystallization resulting in whitening. As has been described hereinbefore, if the saturated polyester resin material is crystallized, the subsequent biaxial orientation which will be described hereinafter in detail, becomes extremely difficult.

Figure 3:
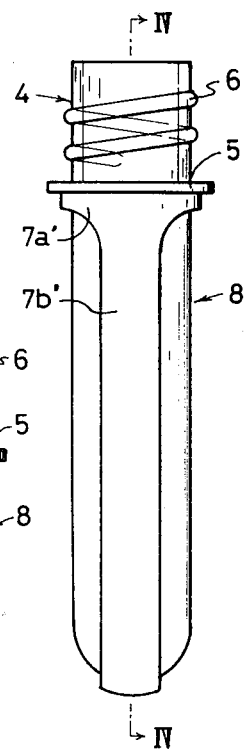
FIG. 3 is a front view of the parison with the welded strip.
Figure 4:
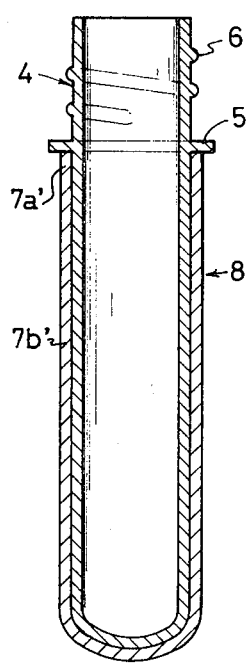
FIG. 4 is a sectional view taken along line IV—IV in FIG. 3.

The strip-shaped pieces 7b' made of saturated polyester resin are welded on the outer face of the parison 8 at diametrically opposed peripheral portions extending vertically from the edge of the flange 5 and an annular piece 7a' is similarly welded below the flange 5 so that the latter is surrounded by the annular piece 7a', as shown in FIGS. 3 and 4. While in the Figures there is shown a parison welded with strip-shaped pieces 7b' having the ends covering the bottom of the parison 8, the lengths of the strip-shaped pieces may be such that the bottom of the parison 8 is not covered by them. It is preferable to use the strip-shaped pieces 7b' and the annular piece 7a' colored by adding with a desired coloring agent for ornament purpose.

The parison 8 thus welded with the strip-shaped pieces 7b' and the annular piece 7a' is then put in blow-mounding machine while being heated to a temperature enabling biaxial orientation and yet causing no whitening. After the strip-shaped pieces and the annular piece are conjoined to form an integral piece, the parison 8 is inflated while elongated in the longitudinal direction to form the bottle 1. In this operation, the annular piece 7a' and the strip-shaped pieces 7b' are fitted in recesses provided on the wall of the blow-molding mould, whereby they form, respectively, the projections 7a and 7b after the biaxial orientation operation. As a result, the projections 7a and 7b are thicker than the other portions of the bottle 1 to reinforce the latter. Since a recess or groove is not provided at the bottom of the mould, no projecting portion is formed at the bottom of the bottle.

If the outer face portions of predetermined locations are heated to a higher temperature during said step of heating the parison 8, such portions are crystallized to form whitened patterns.

As will be apparent from the foregoing description, the present invention is directed to a bottle made of saturated polyester resin and a method of making the same, wherein thicker projections 7a and 7b are formed on the trunk of the bottle, so that the bottle is quite strong even when the wall of the other portions of the bottle is comparitively thin. Moreover, the projections form embossed patterns which may serve as ornaments, if desired. Further, according to the invention, the projections 7b or the like may be easily formed by welding the strip-shaped pieces 7b' made of the same material as that of the body portion of the bottle from a saturated polyester resin which is processed to form an embossed pattern. Furthermore, by using colored strip-shaped pieces 7b' or the like, more preferable colored projecting patterns may be formed.

What is claimed is:

1. In a bottle made of saturated polyester resin having a neck and a trunk and formed by biaxial orientation of a parison of said saturated polyester resin, the improvement comprising a vertically extending, strip-shaped projection formed on the outer surface of said trunk by said biaxial orientation of (1) a strip-shaped piece welded on the outer surface of said parison and (2) said parison.

2. A bottle made of a saturated polyester resin according to claim 1, wherein said strip-shaped projection extends from the neck portion to the bottom of the bottle after the biaxial orientation of the parison.

3. A bottle made of a saturated polyester resin according to claim 2, wherein an annular projection integral with said strip-shaped projection on said bottle is formed around the neck portion, said annular projection being formed by said biaxial orientation of an annular piece welded on said parison prior to said biaxial orientation.

* * * * *